United States Patent [19]

Hoffman

[11] 4,281,352
[45] Jul. 28, 1981

[54] COMPACT PROJECTION TELEVISION SYSTEM

[76] Inventor: Andrew E. Hoffman, 710 Riverside Ave., #1, Santa Cruz, Calif. 95060

[21] Appl. No.: 23,182

[22] Filed: Mar. 23, 1979

[51] Int. Cl.³ .............................................. H04N 5/74
[52] U.S. Cl. .................................................... 358/237
[58] Field of Search .............................. 358/237–239, 358/60, 254; 352/34, 35, 242; 353/79

[56] References Cited

U.S. PATENT DOCUMENTS

| 2,438,256 | 3/1948 | Stein ...................................... 358/237 |
| 2,476,494 | 7/1949 | Jones et al. ........................... 358/239 |
| 2,509,508 | 5/1950 | Kalff et al. ............................ 358/254 |

FOREIGN PATENT DOCUMENTS 747415  4/1956  United Kingdom ..................... 358/237

Primary Examiner—John C. Martin
Attorney, Agent, or Firm—Paul L. Hickman

[57] ABSTRACT

A compact projection television system is disclosed which includes an enclosure having a movable front portion hingedly attached to a fixed rear portion so as to be movable between an open and a closed position. When the movable portion is in the closed position a large viewing screen, projection optics and a television receiver are hidden from sight within the enclosure. When the movable portion is rotated to the open position, the viewing screen elevates and the projection optics unfold to ready the projection television system for use. The raising of the screen and the unfolding of the optics are caused by linkages connecting those members between the fixed and movable portions of the enclosure.

13 Claims, 10 Drawing Figures

FIG. 8
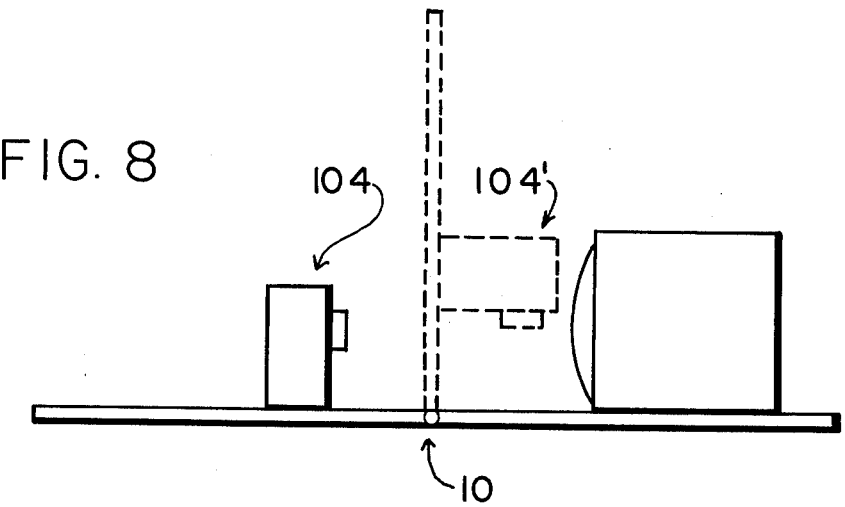
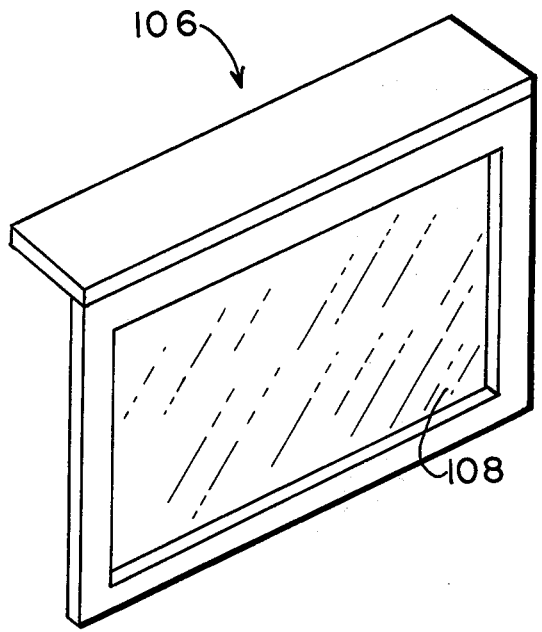
FIG. 10
FIG. 9
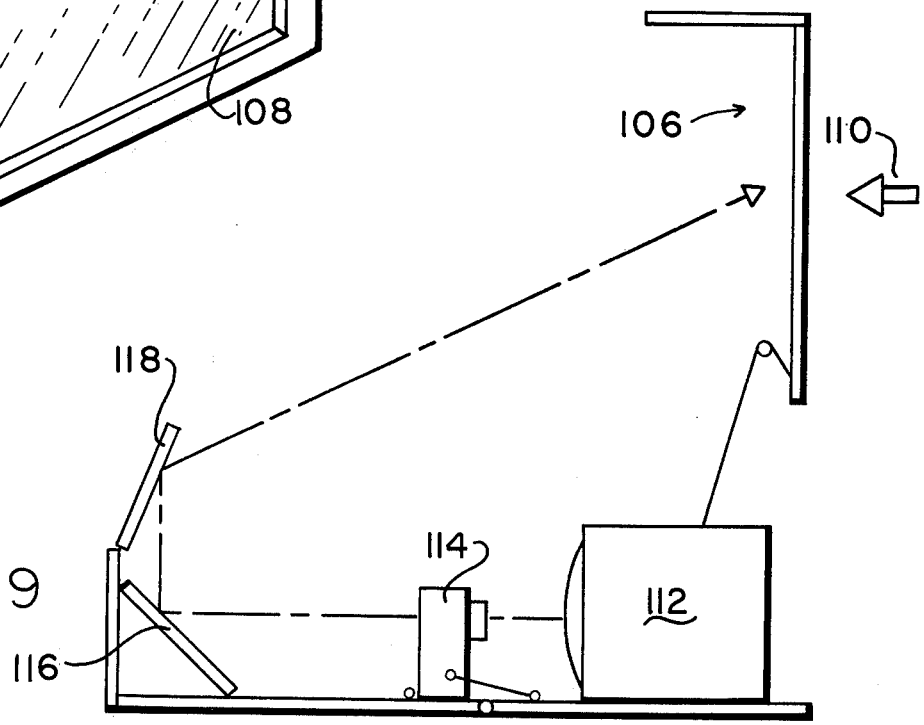

COMPACT PROJECTION TELEVISION SYSTEM

BACKGROUND OF THE INVENTION

1. Field of the Invention

This invention relates generally to television receivers and more particularly to giant screen, projection type television receivers.

2. Description of the Prior Art

Projection, or giant screen, television has been around for many years. A reason behind the interest in giant screen television is that many people feel that a conventional television picture, usually measuring no more than 25 inches on the diagonal, is simply not large enough for truly enjoyable viewing, and would prefer a projection television system having a viewing screen size ranging upwardly from 40 inches on the diagonal.

There are at least three systems in current use which project a large television image upon a screen. The first, and technologically least complicated, system utilizes a lens system to magnify the image produced by a standard television C.R.T. and to project the magnified image upon a viewing screen. Examples of such systems are found in the disclosures of E. Muntz in U.S. Pat. Nos. 3,943,282 and 4,058,838 and of A. Cammilleri in U.S. Pat. No. 4,074,322. Projection televisions of this type have the advantage of being considerably less expensive than other types of projection television systems.

A second type of projection television system utilizes three separate nonstandard C.R.T.'s to produce a relatively bright image upon a viewing screen. Systems such as these have a red tube, a green tube and a blue tube to project separate red, green and blue images which merge together into a single color image at the viewing screen.

While three-tube systems produce a brighter image than the lens and standard C.R.T. systems, they are also considerably more expensive. Furthermore, three-tube systems usually require that the unit housing the three nonstandard C.R.T.'s be separated from the viewing screen by a considerable number of feet. This may be undesirable for some potential customers since a large screen and separate projection unit can undesirably dominate a room's decor. Furthermore, a person walking between the projection unit and the screen can partially block the projected image and thus interfere with the viewing enjoyment of others. Lastly, most all two-piece systems require that wires be run between the projection unit and the screen with inconvenient, unattractive and sometimes dangerous results.

Finally, there is an oil-film type of television projection system which utilizes a thin, translucent film of oil capable of creating a television picture image. Extremely high intensity colored lights are directed through the oil-films to produce a superbright television image upon a viewing screen. Oil-film projection televisions are extremely expensive, often causing many tens of thousands of dollars, and are usually reserved for large scale applications such as within football stadiums or large municipal auditoriums.

A major problem with many projection television systems found in the prior art is that they are usually large, bulky units requiring many feet of floor and wall space. The large size of the systems and the constantly exposed viewing screen further tend to undesirably dominate the decor of a room.

Another problem with projection television systems found in the prior art is that the projection screen, which is highly sensitive to dust, smoke and hand oils, is always exposed to damage. Over a period of time, such hazardous exposure would necessitate frequent cleaning and could necessitate the expensive replacement of the viewing screen.

A problem with the low-cost lens and standard C.R.T. systems is that the picture image on the C.R.T. must often be inverted and/or reversed so that a correctly oriented image will appear on the viewing screen. This inversion and/or reversal is usually accomplished by permanently switching leads on the C.R.T.'s yoke. Due to this modification, the television receiver cannot readily be used independently of the projection television system. Another problem with these inexpensive systems is that they typically can only accommodate one or two sizes of televisions due to various physical and optical restraints.

SUMMARY OF THE INVENTION

It is a major object of this invention to provide a low cost and compact projection television system in which the viewing screen and projection apparatus are hidden from view when not in use.

Another object of this invention is to provide a compact projection television system in which the projection screen is protected within an enclosure when not in use.

Still another object of certain embodiments of this invention is to provide a compact projection television system in which the optics compactly fold within an enclosure when the system is not in use.

A further object of this invention is to provide a projection television system that can utilize a great many sizes and shapes of conventional televisions as part of the projection apparatus.

Yet a further object of this invention is to provide a compact television system which utilizes a conventional television receiver requiring no internal modifications.

Briefly, the invention comprises a compact enclosure which includes a fixed portion and a movable portion that is attached by a hinge to the fixed portion. A viewing screen is retained by a track defined by grooves formed in the walls of the fixed portion so as to be movable between a raised position and a lowered position. A linkage is provided between the movable portion and the screen so that as the movable portion is moved into a first or open position, the viewing screen is elevated to its raised position and as the movable portion is moved into a second or closed position, the viewing screen slides downwardly to its lowered position. A standard television receiver is supported by the fixed closure portion and optics are provided for projecting a magnified television image upon the viewing screen. In one embodiment of this invention the optics include a lens assembly which is attached between the movable and fixed portions so as to compactly fold away when the movable portion is in the second position.

An advantage of this invention is that when the system is not in use, the screen can reside within the closed enclosure so as to remain protected, clean, out of sight and physically out of the way.

Another advantage of this invention is that it is a small, one-piece unit which can be moved about and unobtrusively positioned at many places within a room.

A further advantage of this invention is that the system can be sold without a television receiver so that a consumer's existing television receiver could be used. Due to the design of the optics of the present system, no modification to the television receiver is required. Therefore, a consumer can use the television with or without the projection system for either giant screen viewing or for a viewing of a small screen television. Furthermore, since the internal wiring of the television need not be modified, the television set's warranty will remain in full effect.

These and other objects and advantages of the present invention will no doubt become apparent upon a reading of the following detailed description as accompanied by the several figures of the drawing.

BRIEF DESCRIPTION OF THE DRAWING

FIG. 8 is a simplified line drawing of still a further alternate embodiment of a lens assembly;

FIG. 9 is a simplified line drawing of an alternate embodiment of this invention; and FIG. 10 is a perspective view of the screen assembly shown in FIG. 9.

DETAILED DESCRIPTION OF THE PREFERRED EMBODIMENTS

Figure 1:
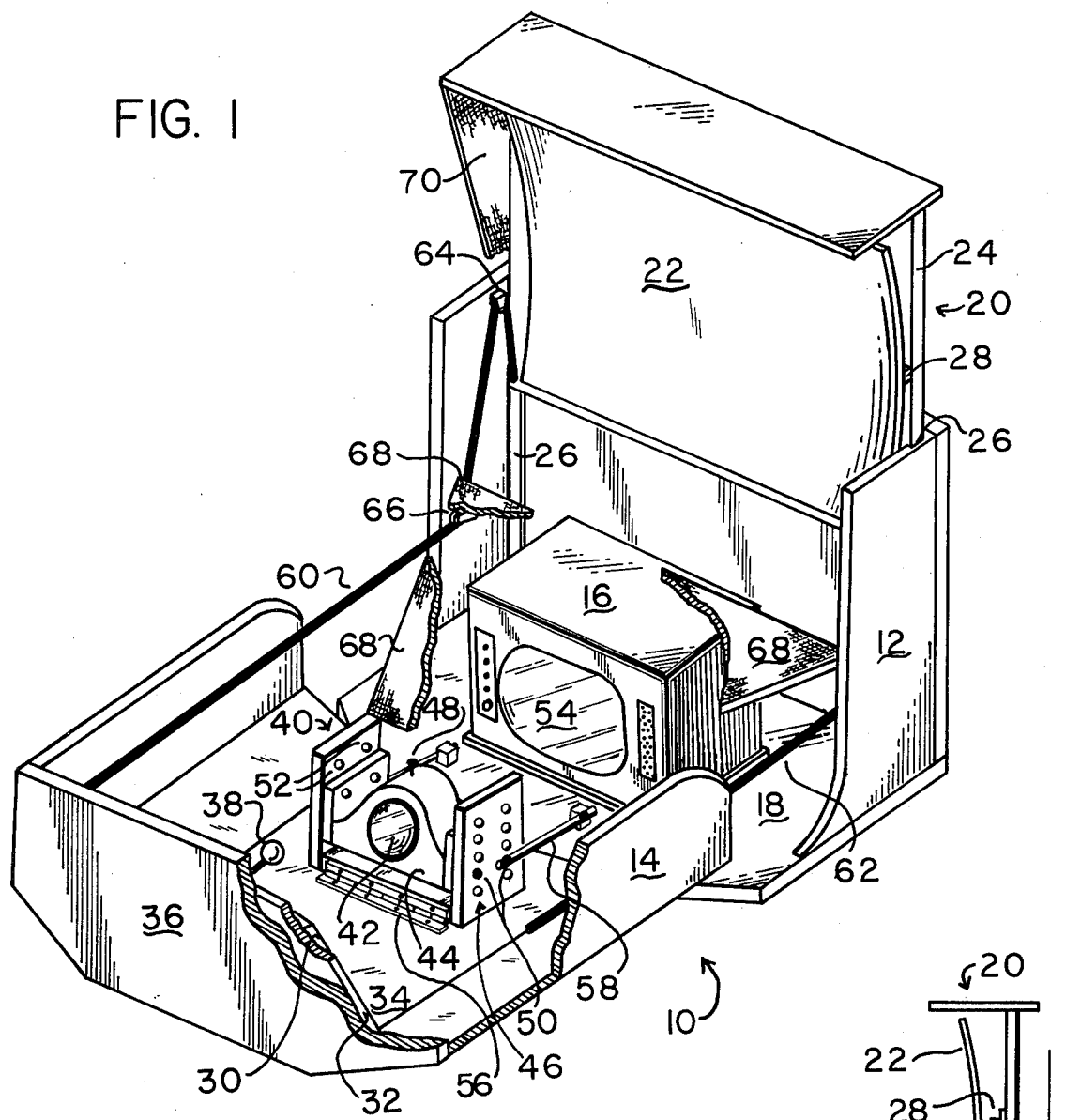
FIG. 1 is a partially broken perspective view of a compact projection television system in accordance with the present invention.

Referring to the perspective view of FIG. 1, a compact projection television system in accordance with the present invention is shown to include a cabinet enclosure 10 having a fixed portion 12 hingedly attached to a movable portion 14. A television receiver 16 is supported in an upside-down position by a surface 18 of the fixed closure portion. Slidably coupled to portion 12 is a screen assembly 20 including a highly reflective viewing screen 22, a screen support 24 having its side edges slidably engaged with a pair of grooved tracks 26 formed along the side walls of portion 12 and a mounting bracket 28 for attaching the viewing screen to support 24.

Coupled to an end section of movable portion 14 is a mirror 30 which can reflect a picture image produced by standard television receiver 16 onto viewing screen 22. Mirror 30 is mounted on a board 32 which is hingedly attached to a surface 34 and to an end section 36 of portion 14 by an angle adjustment screw 38.

Also coupled to surface 34 is a lens assembly 40 including a lens 42, a lens support 44, and a support bracket 46. Lens 42, which in this embodiment is an assembly of lenses housed within a cylindrical casing, is held within a cylindrical bore of lens support 44 by a set screw 48. When the set screw is loosened, lens 42 may slide back and forth within the cylindrical bore to adjust the focus of the projected television image.

Lens support 44 is adjustably attached to support bracket 46 by a number of bolts 50 disposed through four vertical columns of holes 52. The height of the lens support is adjustable so that the lens may be aligned with the center of a C.R.T. 54 of television receiver 16. By providing such an adjustment, television receivers of various sizes and types may be used.

In this embodiment, support bracket 46 is attached to surface 34 by means of a piano hinge 56. The support bracket is further coupled to portion 12 by a pair of linkage arms 58 which are pivotally attached at one end to surface 18 and pivotally attached at the other end to the sides of support bracket 46. These linkages cause the lens assembly to fold against surface 34 when movable portion 14 is in the upright or closed position so that the lens assembly will be prevented from entering the volume of space normally occupied by television receiver 16, possibly breaking C.R.T. 54.

Screen assembly 20 is linked to movable portion 14 by a pair of cables 60 and 62 which are preferably trained over a number of pulleys, such as pulleys 64 and 66. As will be discussed in greater detail with reference to a later figure, when movable portion 14 is pivoted to its opened position, screen support 24 is pulled by cables 60 and 62 into its raised position and when movable portion 14 is rotated to its closed position, the screen support is lowered by cables 60 and 62 to its lowered position.

In another embodiment of this invention, pulley 66 and the pulley on the other side of the fixed portion corresponding to pulley 66 are omitted so that each of the cables is trained over only one pulley. An optional shroud 70 (shown here mostly broken away) and an optional shroud 68 (again shown broken away) may be provided to minimize the effects of ambient room light upon the image projected on screen 22. Shroud 68 further blocks C.R.T. 54 from view so as to minimize viewer distraction.

Figure 2:
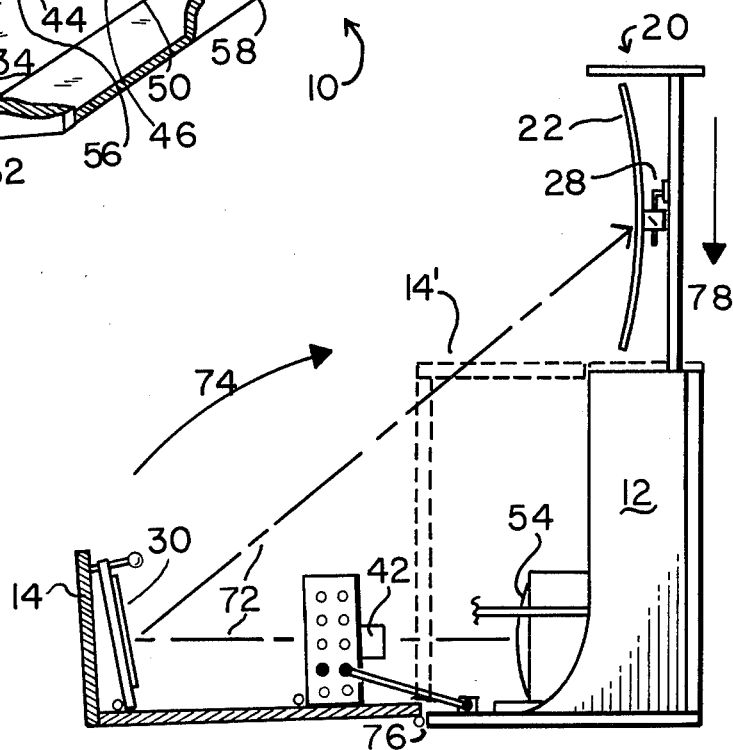
FIG. 2 is a partially broken side elevational view of the projection television system shown in FIG. 1.

In FIG. 2 a slightly simplified side elevational view of the system is shown to indicate how a picture image from standard C.R.T. 54 can be projected by lens 42 upon mirror 30 and then screen 22 along an optical path indicated by a broken line 72. As better seen in this figure, mounting bracket 28 allows both a vertical adjustment of screen 22 as well as a tilt adjustment in order to maximize the brightness of the projected image seen by an audience. As indicated by arrow 74, when movable portion 14 is pivoted around a hinge 76 to an upright position at 14', screen assembly 20 slides down (as indicated by an arrow 78) along the sides of the fixed portion.

Figure 3:
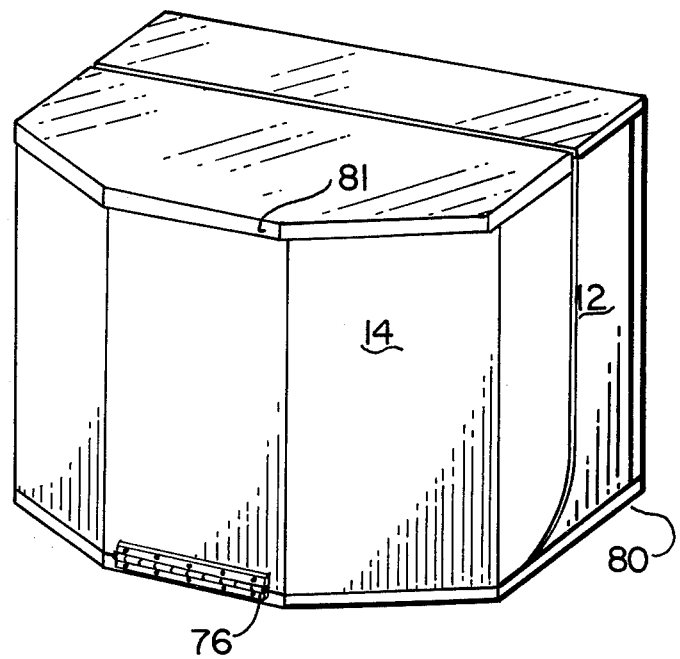
FIG. 3 is a perspective view of a compactly folded projection television system.

In FIG. 3, the system is shown to be folded into its closed or non-viewing position. In this position, the edges of movable portion 14 are flush with the edges of fixed portion 12 and the entire system has a neat, finished furniture look. Of course, the actual configuration of the two portions of the closure may vary according to different consumer's styles and preferences. In this embodiment, sharp corners are beveled or rounded to add strength and beauty to the structure and to further minimize the chance for accidental impalement against a sharp edge. The bottom of the enclosure may be provided with casters so that the entire unit may be wheeled about, and the lower edge of screen support 24 may fit within a well which extends below the bottom board 80 of the fixed portion so that the total height of the closed system need not be substantially greater than that of screen 22 itself. Furthermore, speakers can be provided in the sides or in other surfaces of either the movable or fixed portions of the enclosure. A lip 81 may be provided along the forward edge of the movable portion to act as a handle.

Figure 4:
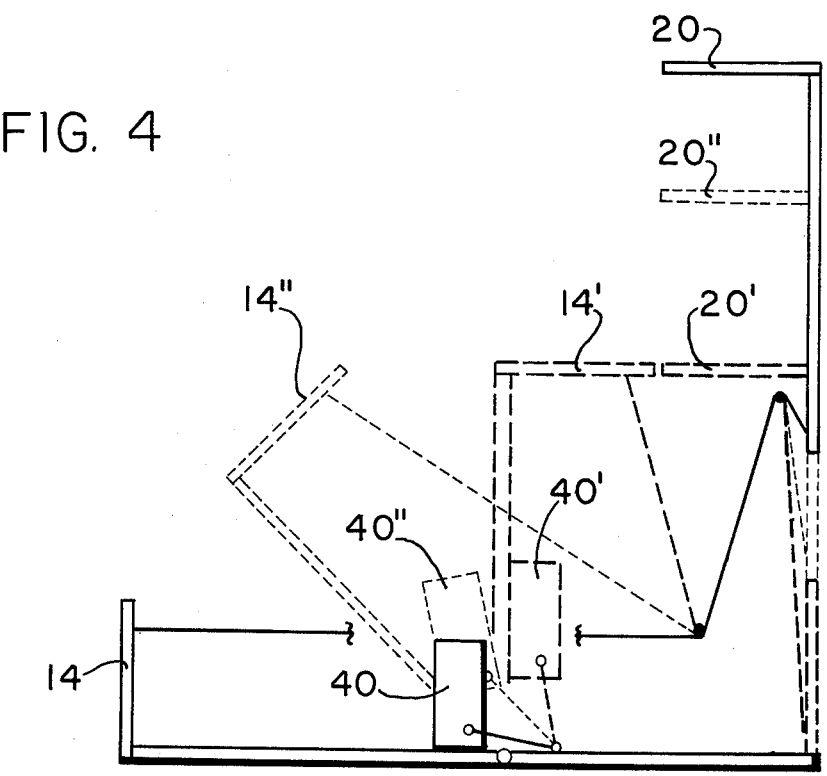
FIG. 4 is a simplified line drawing illustrating the movement of the viewing screen and projection lens assembly as the movable portion of the enclosure is opened and closed.

Referring now to FIG. 4, the movable portion is shown in an open position at 14, in a semi-open position at 14", and in a closed position at 14'. Due to the cable linkage between the movable portion and the screen assembly, the screen assembly will be in a raised position at 20 when the movable portion is in an open position, in a semi-raised position at 20" when the movable portion is in a semi-opened position, and in a lowered position at 20' when the movable portion is in a closed position. Also, due to the linkages to both the movable and fixed portions of the enclosure, the lens assembly will be positioned as shown at 40 when the movable portion is in an open position, will be positioned as shown at 40" when the movable portion is in a semi-opened position, and will be positioned as shown at 40' when the movable portion is in a closed position. The pivoting of the lens assembly prevents it from attempting to occupy the same volume of space as television receiver 16 when the movable portion is pivoted to its closed position.

Figure 5:
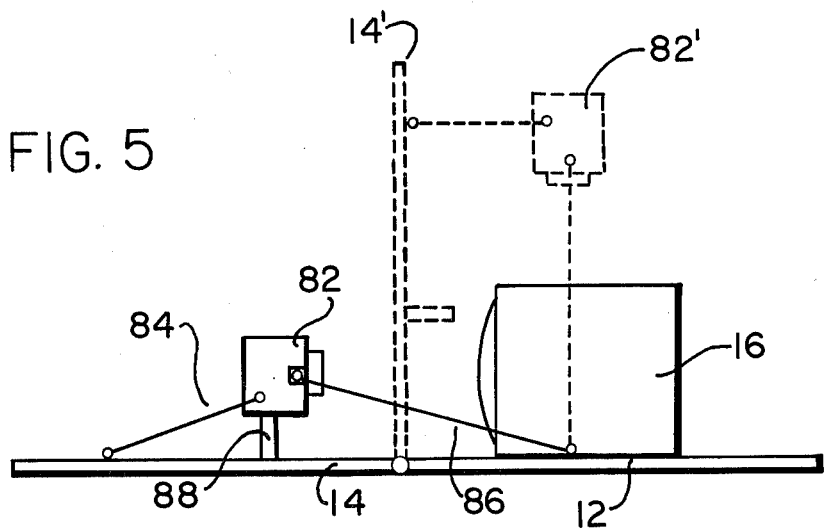
FIG. 5 is a simplified line drawing illustrating an alternate embodiment of the lens assembly of the present invention.

Referring now to FIG. 5, an alternate coupling of a lens assembly 82 between a movable portion 14 and a fixed portion 12 is shown. In this embodiment, two linkage arms are used, the first linkage arm 84 pivotally coupling lens assembly 82 to portion 14 and the second linkage arm 86 pivotally coupling lens assembly 82 to movable portion 12. As movable portion 14 is pivoted to its upright position at 14', lens assembly 82 is pivoted to a new position at 82' which places it above the television receiver 16. When the movable portion 14 is in the open position, lens assembly can sit upon a rest 88.

Figure 6:
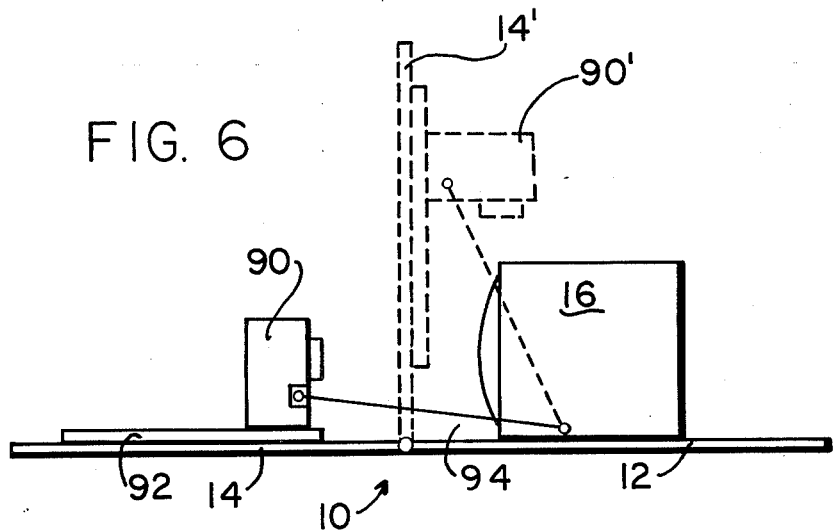
FIG. 6 is a simplified line drawing of another alternate embodiment of the lens assembly of the present invention.

In FIG. 6 another method for attaching a lens assembly 90 to enclosure 10 is shown. In this embodiment, lens assembly 90 is attached along its base to a rail 92 and is pivotally connected to the fixed portion by a linkage arm 94. As movable portion 14 is pivoted to its closed position at 14', the lens assembly will slide along rail 92 to a new position 90', which is out of the way of television receiver 16.

Figure 7:
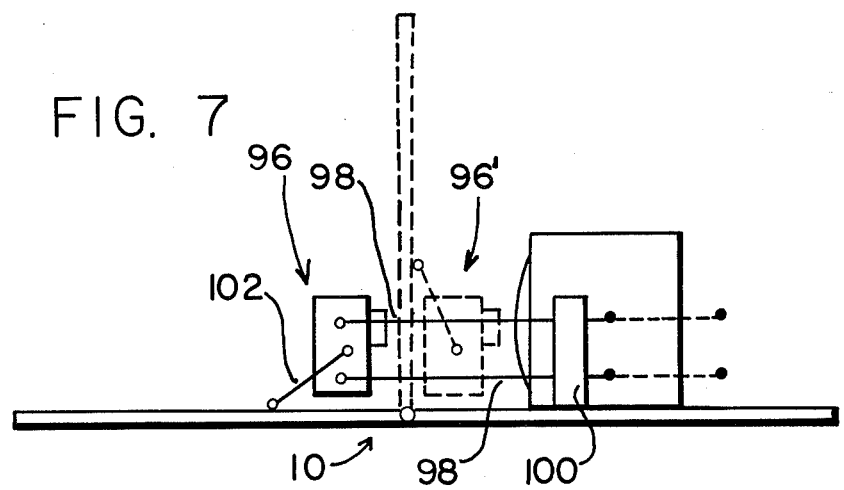
FIG. 7 is a simplified line drawing of yet another alternate embodiment of a lens assembly.

In FIG. 7 a lens assembly 96 is attached to the fixed portion of an enclosure 10 by a pair of guide arms 98 slidably engaged with a guide block 100 and is pivotally attached to the movable portion of the enclosure by a linkage arm 102. As the movable portion is rotated to its vertical position, the lens assembly is moved horizontally towards the television receiver to a new position 96'.

In FIG. 8 a lens assembly 104 is rigidly attached to the movable portion of the enclosure 10. When the movable portion is rotated to a vertical position, the lens assembly attains a new position 104'. Note that the television must be positioned farther back from the lens assembly than is necessary for some of the previously discussed embodiments.

Referring to both FIGS. 9 and 10 an alternate embodiment of the present invention is illustrated which includes a screen assembly 106 having a rear view screen 108 which is viewed by an audience from a direction indicated by an arrow 110. This embodiment also includes a television receiver 112, a lens assembly 114, and a pair of mirrors 116 and 118. An advantage of this embodiment of the present invention is that receiver 112 need not be inverted to project a correctly oriented image on screen 108.

Of course, there are many ways for coupling a lens assembly to the enclosure so that it is pivoted out of the way of the television receiver as the movable portion is rotated to its closed position. Also, many types of lenses, such as the flat, fresnel lenses, may be used in the lens assembly.

Furthermore, there are many methods for linking the screen assembly to the movable portion. For instance, rigid linkage arms instead of cables could be used. Also, the screen assembly need not be slidably attached to the fixed portion but could fold down over the top of the closure.

Finally, this invention is not limited to the use of standard television receivers. For example, a three C.R.T. type projector could be used instead of a standard television C.R.T. to obtain a brighter picture.

It is therefore intended that the following appended claims be interpreted as including all such alternatives as fall within the true spirit and scope of this invention.

I claim:

1. A compact projection television system comprising:
    enclosure means including
        a fixed portion having a substantially horizontal first surface, and
        a movable portion coupled to said fixed portion and having a second surface, said movable portion being movable between a closed position in which said first surface and said second surface are substantially perpendicular and an open position in which said first surface and said second surface are substantially parallel;
    television receiver means supported by said first surface and occupying a first volume of space;
    screen means coupled to said fixed portion so as to be movable between a raised position and a lowered position, said screen means including
        a screen support slidably coupled to said fixed portion so as to be vertically movable between said raised postion and said lowered position,
        a screen, and
        an adjustable bracket means for attaching said screen to said screen support;
    first linkage means coupling said screen means to said movable portion so that when said movable portion is in said closed position said screen means is in said lowered position and when said movable portion is in said open position said screen means is in said raised position;
    mirror means coupled to said movable portion for reflecting a picture image produced by said television receiver means onto said screen means when said movable portion is in said open position and
    lens means disposed along an optical path between said television receiver means and said mirror means when said movable closure portion is in said open position.

2. A compact projection television system as recited in claim 1 wherein lens means includes
    a lens,
    a lens support holding said lens, and
    coupling means coupling said lens support to said enclosure means.

3. A compact projection television system as recited in claim 2 wherein said coupling means includes
second linkage means attaching said lens support to said movable portion, and
third linkage means attaching said lens support to said fixed portion,
whereby interaction between said second linkage means and said third linkage means as said movable portion is moved from said open position to said closed position causes said lens support to move so as not to enter said first volume of space.

4. A compact projection television system as recited in claim 3 wherein
said second linkage means is a hinge, and
said third linkage means is an elongated linkage arm having one end pivotally attached to said fixed portion and the other end pivotally attached to said lens support.

5. A compact projection television system as recited in claim 3 wherein
said second linkage means is a first elongated linkage arm having one end pivotally attached to said movable portion and having the other end pivotally attached to said lens support, and
said third linkage means is a second elongated linkage arm having one end pivotally attached to said fixed portion and the other end pivotally attached to said lens support.

6. A compact projection television system as recited in claim 3 wherein
said second linkage means is a track means attached to said movable portion and a track follower means attached to said lens support, and
said third linkage means is an elongated linkage arm having one end pivotally attached to said fixed portion and the other end pivotally attached to said lens support.

7. A compact projection television system as recited in claim 3 wherein
said second linkage means is an elongated linkage arm having one end pivotally attached to said movable portion and having the other end pivotally attached to said lens support, and
said third linkage means includes at least one guide arm attached at one end to said lens support and slidably coupled to said fixed portion.

8. A compact projection television system as recited in claim 2 wherein
said lens support is rigidly attached to said movable portion.

9. A compact projection television system as recited in claim 1 wherein
said screen means includes a rear-projection type viewing screen, and
said mirror means includes two reflective surfaces adapted to reflect an image from said television receiver means to a rear surface of said viewing screen.

10. A compact projection television system as recited in claim 1 wherein said first linkage means includes
pulley means coupled to said fixed portion, and
cable means trained around said pulley means and having one end attached to said screen support and the other end attached to said movable portion.

11. A compact projection television system as recited in claim 1 further comprising
first shroud means attached to said screen support to inhibit ambient light from striking said screen.

12. A compact projection television system as recited in claim 11 further comprising
second shroud means coupled between said fixed portion and said movable portion to shade said lens means and said television receiver.

13. A compact projection television system cabinet for use with a television receiver comprising:
enclosure means includine
a fixed portion, and
a movable portion coupled to said fixed portion and movable between an open and a closed position;
screen means coupled to said fixed portion;
linkage means coupling said screen means to said movable portion so that said screen means is in a lowered position when said movable portion is in said closed position and is in a raised position when said movable portion is in said open position;
a lens means for projecting a magnified image upon said screen means from the C.R.T. of a television supported by said fixed portion; and
linkage means coupling said lens means to both said movable portion and said fixed portion so that when said movable portion is in said closed position said lens means is moved so as not to contact said television receiver.

* * * * *